(12) United States Patent
Auyeung

(10) Patent No.: US 8,974,077 B2
(45) Date of Patent: Mar. 10, 2015

(54) HEAT SINK FOR LED LIGHT SOURCE

(71) Applicant: Ultravision Holdings, LLC, Dallas, TX (US)

(72) Inventor: David Siucheong Auyeung, Carrollton, TX (US)

(73) Assignee: Ultravision Technologies, LLC, Dallas, TX (US)

(*) Notice: Subject to any disclaimer, the term of this patent is extended or adjusted under 35 U.S.C. 154(b) by 0 days.

(21) Appl. No.: 13/836,517

(22) Filed: Mar. 15, 2013

(65) Prior Publication Data

US 2014/0029259 A1    Jan. 30, 2014

Related U.S. Application Data

(60) Provisional application No. 61/677,346, filed on Jul. 30, 2012.

(51) Int. Cl.
*F21V 21/00*    (2006.01)
*F21V 29/00*    (2006.01)

(52) U.S. Cl.
CPC .............. *F21V 29/2206* (2013.01); *F21V 29/22* (2013.01); *F21V 29/00* (2013.01)
USPC .................. 362/218; 362/249.02; 362/294

(58) Field of Classification Search
USPC ............................................ 362/218, 249.02
See application file for complete search history.

(56) References Cited

U.S. PATENT DOCUMENTS

| | | | |
|---|---|---|---|
| 4,235,285 A | 11/1980 | Johnson et al. |
| 4,679,118 A | 7/1987 | Johnson et al. |
| 5,036,248 A | 7/1991 | McEwan et al. |
| 5,083,194 A | 1/1992 | Bartilson |
| 5,329,426 A | 7/1994 | Villani |
| 5,384,940 A | 1/1995 | Soule et al. |
| 5,818,640 A | 10/1998 | Watanabe et al. |
| 5,857,767 A | 1/1999 | Hochstein |
| 5,896,093 A | 4/1999 | Sjobom |
| 6,045,240 A | 4/2000 | Hochstein |

(Continued)

FOREIGN PATENT DOCUMENTS

| | | |
|---|---|---|
| EP | 2553331 A1 | 2/2013 |
| EP | 2622267 A1 | 8/2013 |
| WO | 2006126123 A1 | 11/2006 |

OTHER PUBLICATIONS

Lee, S., "How to Select a Heat Sink," http:www.electronics-cooling.com/1995/06/how-to-select-a-heat-sink/, Jun. 1, 1995, pp. 1-10.

(Continued)

*Primary Examiner* — John A Ward
(74) *Attorney, Agent, or Firm* — Slater & Matsil, L.L.P.

(57) ABSTRACT

A back panel for use in a light emitting diode (LED) lighting assembly is disclosed. An extruded substrate formed of a thermally conductive material is provided, the substrate having a plurality of fins extending from a first side of the substrate, each of the fins having a substantially rectangular shape oriented so that a longitudinal axis of the fin is substantially parallel to a longitudinal axis of the substrate. At least some of the fins include a hole formed through the fin to enable heated air to rise through the fins. A plurality of LEDs are mounted on a second side of the substrate, and oriented in a longitudinal orientation with the fins oriented parallel to the bottom edge of a surface to be illuminated, such that heat rises perpendicular to the surface of the fin.

33 Claims, 13 Drawing Sheets

(56) References Cited

U.S. PATENT DOCUMENTS

| | | |
|---|---|---|
| 6,274,924 B1 | 8/2001 | Carey et al. |
| 6,364,507 B1 | 4/2002 | Yang |
| 6,428,189 B1 | 8/2002 | Hochstein |
| 6,517,218 B2 | 2/2003 | Hochstein |
| 6,799,864 B2 | 10/2004 | Bohler et al. |
| 6,864,513 B2 | 3/2005 | Lin et al. |
| 7,048,400 B2 | 5/2006 | Murasko et al. |
| 7,144,135 B2 | 12/2006 | Martin et al. |
| 7,159,997 B2 | 1/2007 | Reo et al. |
| 7,375,381 B2 | 5/2008 | Shimizu et al. |
| 7,396,146 B2 | 7/2008 | Wang |
| 7,434,964 B1 | 10/2008 | Zheng et al. |
| 7,458,706 B1 | 12/2008 | Liu et al. |
| 7,513,653 B1 | 4/2009 | Liu et al. |
| 7,549,777 B2 | 6/2009 | Huang |
| 7,654,684 B1 | 2/2010 | Wight et al. |
| 7,686,469 B2 | 3/2010 | Ruud et al. |
| 7,748,863 B1 | 7/2010 | Holman et al. |
| 7,857,483 B2 | 12/2010 | Storch et al. |
| 7,866,851 B2 | 1/2011 | Chang |
| 7,896,522 B2 | 3/2011 | Heller et al. |
| 7,905,634 B2 | 3/2011 | Agurok et al. |
| 7,952,262 B2 | 5/2011 | Wilcox et al. |
| 8,035,119 B2 | 10/2011 | Ng et al. |
| 8,052,303 B2 | 11/2011 | Lo et al. |
| 8,056,614 B2 | 11/2011 | Chen et al. |
| 8,092,049 B2 | 1/2012 | Kinnune et al. |
| 8,192,048 B2 | 6/2012 | Kristoffersen et al. |
| 8,201,970 B2 | 6/2012 | Wang et al. |
| 8,235,553 B2 | 8/2012 | Minami et al. |
| 8,246,219 B2 | 8/2012 | Teng et al. |
| 8,267,551 B2 | 9/2012 | Lin |
| 8,273,158 B2 | 9/2012 | Jarrier et al. |
| 8,308,331 B2 | 11/2012 | Loh |
| 8,310,158 B2 | 11/2012 | Coplin et al. |
| 8,330,387 B2 | 12/2012 | York et al. |
| 8,338,841 B2 | 12/2012 | Lerman et al. |
| 8,348,461 B2 | 1/2013 | Wilcox et al. |
| 8,360,613 B2 | 1/2013 | Little, Jr. |
| 8,376,585 B2 | 2/2013 | Noeth |
| 8,454,194 B2 | 6/2013 | Liu |
| 8,454,215 B2 | 6/2013 | Bollmann |
| 8,465,178 B2 | 6/2013 | Wilcox et al. |
| 8,547,023 B2 | 10/2013 | Chang et al. |
| 8,567,987 B2 | 10/2013 | Wronski |
| 8,577,434 B2 | 11/2013 | Merchant et al. |
| 8,602,599 B2 | 12/2013 | Zimmer et al. |
| 8,610,357 B2 | 12/2013 | Stoll et al. |
| 8,622,574 B2 | 1/2014 | Liu |
| 8,628,217 B2 | 1/2014 | Moshtagh |
| 2004/0004827 A1 | 1/2004 | Guest |
| 2005/0047170 A1 | 3/2005 | Hilburger et al. |
| 2006/0146531 A1 | 7/2006 | Reo et al. |
| 2008/0080179 A1 | 4/2008 | Giorgi |
| 2008/0084701 A1 | 4/2008 | Van De Ven et al. |
| 2008/0180014 A1 | 7/2008 | Tzeng et al. |
| 2009/0097265 A1 | 4/2009 | Sun et al. |
| 2009/0180281 A1 | 7/2009 | Ahland, III et al. |
| 2009/0256459 A1* | 10/2009 | Liu ................................. 313/12 |
| 2009/0303711 A1 | 12/2009 | Remus et al. |
| 2010/0008094 A1 | 1/2010 | Shuai et al. |
| 2010/0046225 A1* | 2/2010 | Zheng ..................... 362/249.03 |
| 2010/0085774 A1 | 4/2010 | Park |
| 2010/0232155 A1 | 9/2010 | Wang |
| 2010/0296267 A1 | 11/2010 | Yu et al. |
| 2011/0002120 A1 | 1/2011 | Song et al. |
| 2011/0031887 A1 | 2/2011 | Stoll et al. |
| 2011/0149548 A1 | 6/2011 | Yang et al. |
| 2011/0170283 A1 | 7/2011 | Chan |
| 2011/0242816 A1 | 10/2011 | Chowdhury et al. |
| 2011/0278633 A1 | 11/2011 | Clifford |
| 2011/0280003 A1 | 11/2011 | Hsu et al. |
| 2012/0080699 A1 | 4/2012 | Chowdhury et al. |
| 2012/0163005 A1 | 6/2012 | Liu |
| 2012/0201022 A1 | 8/2012 | van de Ven et al. |
| 2012/0250321 A1 | 10/2012 | Blincoe et al. |
| 2013/0057861 A1 | 3/2013 | Ishii et al. |
| 2013/0063970 A1 | 3/2013 | Oh |
| 2013/0193850 A1 | 8/2013 | Demuynck et al. |
| 2013/0270585 A1 | 10/2013 | Mei et al. |
| 2014/0029259 A1 | 1/2014 | Auyeung |

OTHER PUBLICATIONS

Arik, M., "Thermal Management of LEDs: Package to System," Third International Conference on Solid State Lighting, Proc. of SPIE, vol. 5187, Jan. 21, 2012, pp. 64-75.

* cited by examiner

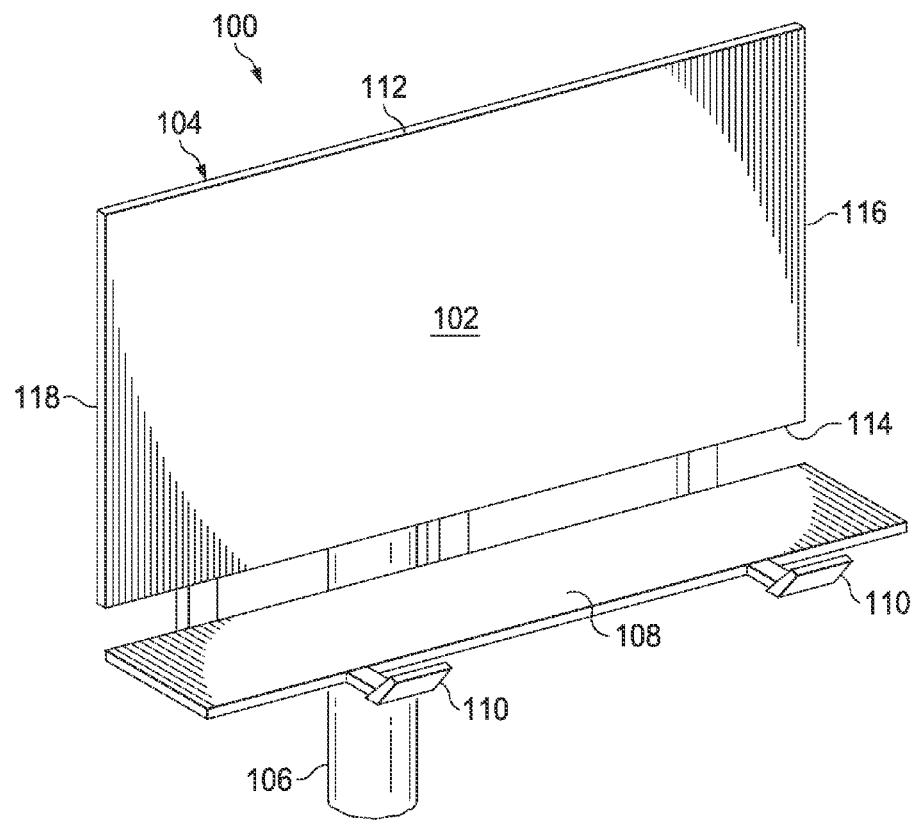
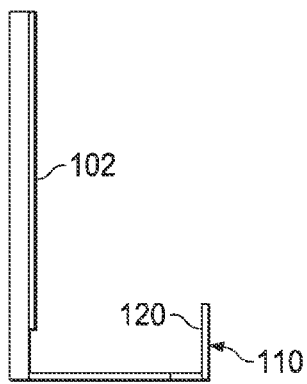 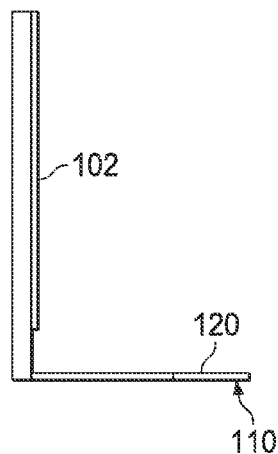 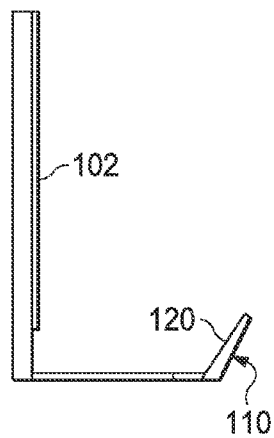
FIG. 1A
FIG. 1B   FIG. 1C   FIG. 1D

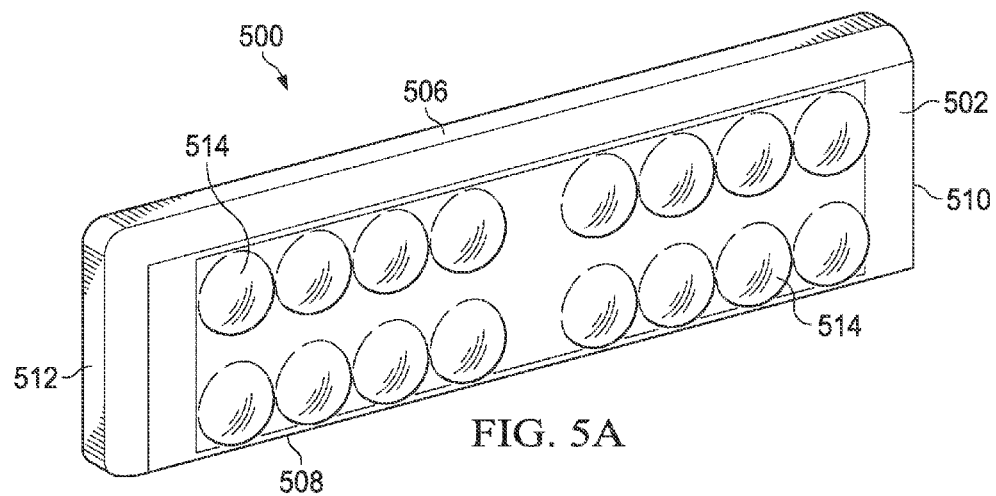
FIG. 5A
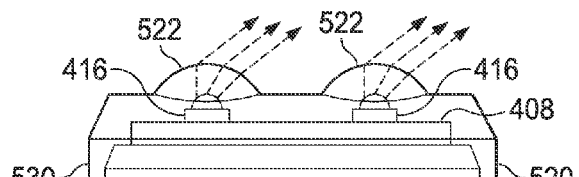
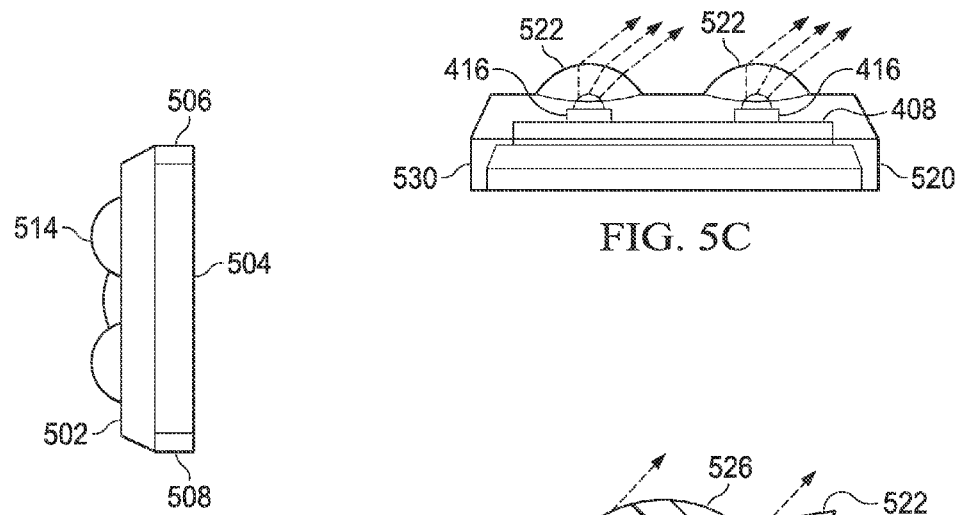
FIG. 5B
FIG. 5C
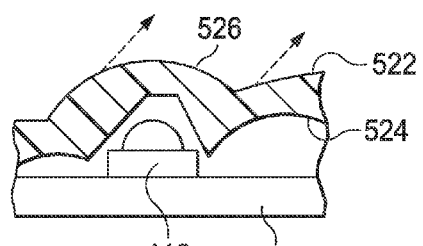
FIG. 5D

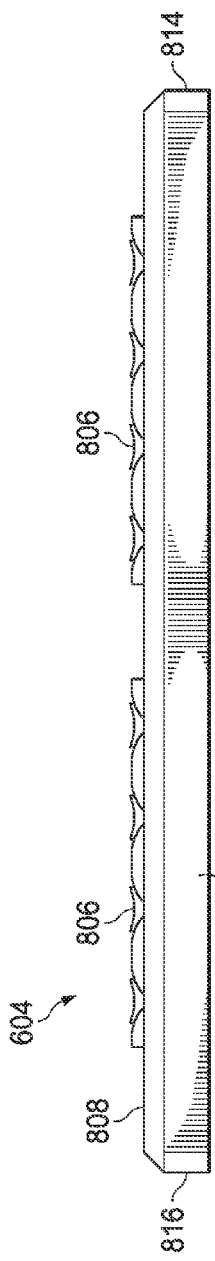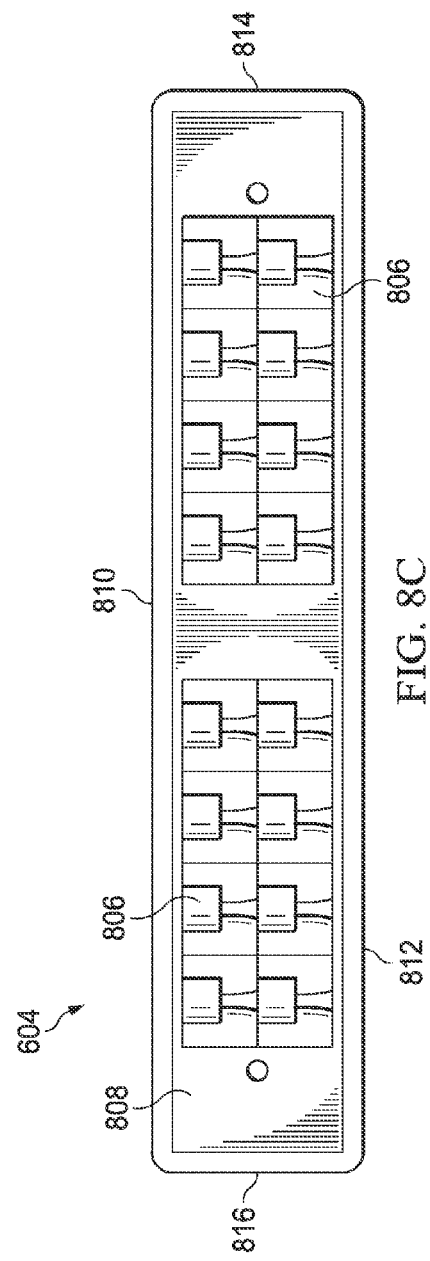

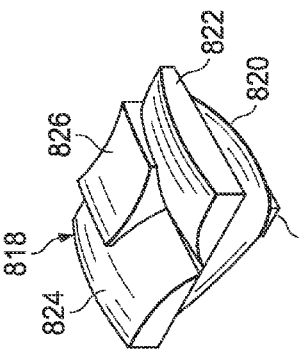
FIG. 8G
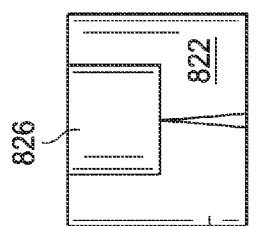
FIG. 8F
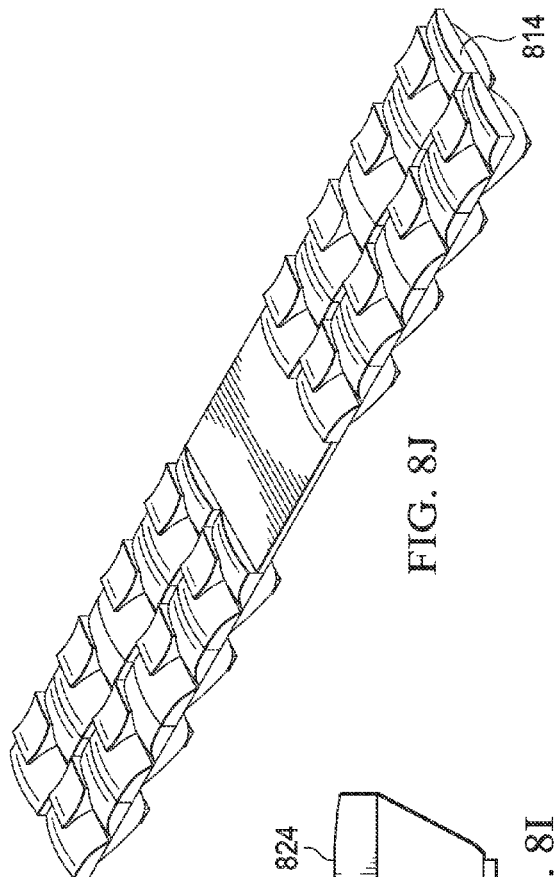
FIG. 8J
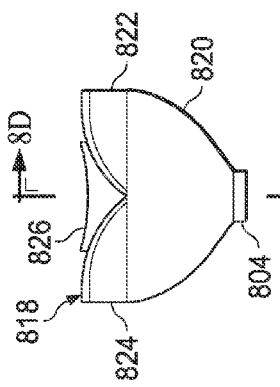
FIG. 8E
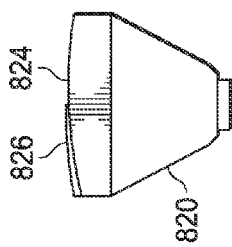
FIG. 8I
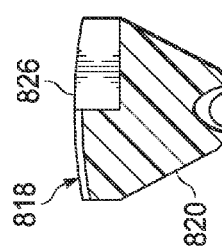
FIG. 8D
FIG. 8H

HEAT SINK FOR LED LIGHT SOURCE

CROSS-REFERENCE TO RELATED APPLICATIONS

This application claims benefit of U.S. Provisional Application No. 61/677,346, filed Jul. 30, 2012, entitled HEAT SINK FOR LED LIGHT SOURCE, the specification of which is incorporated herein in its entirety

TECHNICAL FIELD

The following disclosure relates to lighting systems and, more particularly, to lighting systems using light emitting diodes to externally illuminate signs.

SUMMARY

The present invention, in one aspect thereof, comprises a back panel for use in a light emitting diode (LED) lighting assembly. An extruded substrate formed of a thermally conductive material is provided, the substrate having a plurality of fins extending from a first side of the substrate, each of the fins having a substantially rectangular shape oriented so that a longitudinal axis of the fin is substantially parallel to a longitudinal axis of the substrate. At least some of the fins include a hole formed through the fin to enable heated air to rise through the fins. A plurality of LEDs are mounted on a second side of the substrate, and oriented in a longitudinal orientation with the fins oriented parallel to the bottom edge of a surface to be illuminated, such that heat rises perpendicular to the surface of the fin.

BRIEF DESCRIPTION OF THE DRAWINGS

For a more complete understanding, reference is now made to the following description taken in conjunction with the accompanying Drawings in which:

FIG. 1 illustrates one embodiment of a billboard that may be externally lighted by one or more lighting assemblies;

FIGS. 1B-1D illustrate embodiments of angular positions of the lighting assembly of FIG. 1 relative to the billboard;

FIGS. 5A, 5B, 5C and 5D illustrate one embodiment of an optics panel that may be used with the lighting assembly of FIG. 2;

FIGS. 8B-8J illustrates embodiments of the optics panel of FIG. 8A and optical elements that may be used to form part of the optics panel.

DETAILED DESCRIPTION

Figure 2:
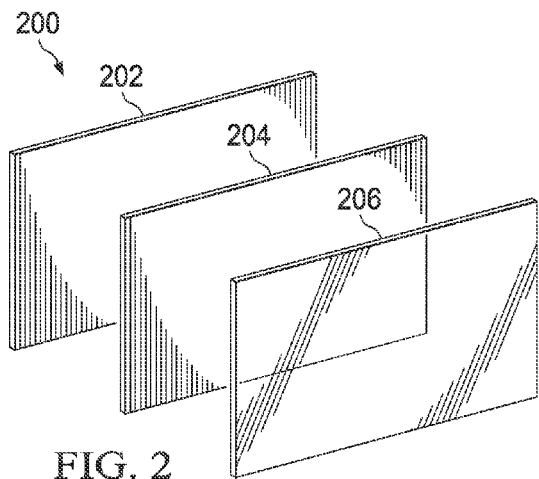
FIG. 2 illustrates one embodiment of a lighting assembly that may be used to light the billboard of FIG. 1.

Billboards, such as those commonly used for advertising in cities and along roads, often have a picture and/or text that must be externally illuminated to be visible in low-light conditions. As technology has advanced and introduced new lighting devices such as the light emitting diode (LED), such advances have been applied to billboards. However, current lighting designs have limitations and improvements are needed. Although billboards are used herein for purposes of example, it is understood that the present disclosure may be applied to lighting for any type of sign that is externally illuminated.

Referring to FIG. 1A, one embodiment of a billboard 100 is illustrated. The billboard 100 includes a surface 102 onto which a picture and/or text may be painted, mounted, or otherwise affixed. The surface 102 may be any size, such as a commonly used size having a width of forty-eight feet wide and a height of fourteen feet. The surface 102 may be provided by placing a backing material on a frame 104 made of steel and/or other materials. The frame 104 may be mounted on one or more support poles 106, which may be considered part of the frame 104 or separate from the frame 104. The billboard 100 may include a walkway or other support structure 108 that enables the surface 102 to be more easily accessed.

One or more lighting assemblies 110 may be coupled to the walkway 108 (e.g., to a safety rail or to the walkway itself) and/or to another structural member of the billboard 100 to illuminate some or all of the surface 102 in low light conditions. The lighting assembly 110 may be mounted at or near a top edge 112 of the billboard 100, a bottom edge 114 of the billboard 100, a right edge 116 of the billboard 100, and/or a bottom edge 118 of the billboard 100. The lighting assembly 110 may be centered (e.g., located in approximately the center of the billboard 100) or off center as illustrated in FIG. 1A.

With additional reference to FIGS. 1B-1D, a surface 120 of the lighting assembly 110 may be parallel with respect to the surface 102 of the billboard 100 (FIG. 1B), may be perpendicular with respect to the surface 102 (FIG. 1C), or may be angled with respect to the surface 102 (FIG. 1D). It is understood that the lighting assembly 110 may be placed in many different orientations and locations relative to the billboard 100 and to one another, and the illustrated positions are only for purposes of example. Furthermore, it is understood that references to "top," "bottom," "left," and "right" are used in the present disclosure for purposes of description and do not necessarily denote a fixed position. For example, the billboard 100 may be turned on end, and the referenced "top," "bottom," "left," and "right" edges may still be readily identifiable although the "top" edge would be the "left" edge or the "right" edge.

One problem with current lighting technology is that it can be difficult to direct light only onto the surface 102 and even more difficult to do so evenly. This may be due partly to the placement of the lighting assembly 110, as shown in FIGS. 1B-1D. As the lighting assembly 110 is off center relative to the surface 102, light emitted from the lighting assembly 110 may not evenly strike the surface 102. One problem with uneven illumination is that certain parts of the surface 102 may be more brightly illuminated than other parts. This creates "hot spots" that may be undesirable. Attempting to evenly illuminate the surface 102 may cause light to be directed past the edges 112, 114, 116, and 118 as attempts are made to balance out hot spots in particular areas. However, light that does not strike the surface 102 is wasted and may create problems (e.g., light pollution), as well as waste illumination that could be used for the surface 102.

In addition to the difficulties of evenly illuminating the surface 102, the use of LEDs in an exterior lighting environment involves issues such as heat dissipation and protecting the LEDs against environmental conditions such as moisture. The presence of moving mechanical features such as fans that may be used to provide increased airflow for cooling may create additional reliability problems. Due to the difficulty and expense of replacing and/or repairing the lighting assembly 110 in combination with the desire to provide consistent lighting while minimizing downtime, such issues should be addressed in a manner that enhances reliability and uptime.

Referring to FIG. 2, one embodiment of a lighting assembly 200 is illustrated. The lighting assembly 200 provides a more detailed embodiment of the lighting assembly 110 of FIG. 1. The lighting assembly 200 includes a back panel 202, a light panel 204 (e.g., a printed circuit board (PCB)) having a plurality of LEDs (not shown) mounted thereon, and an optics panel 206. As will be described below in more detailed examples, light from the LEDs of the light panel 204 may be directed by the optics panel 206 to illuminate the surface 102 of the billboard 100 of FIG. 1. The back panel 202 may be configured to serve as a supporting substrate for the light panel 204 and optics panel 206, as well as to dissipate heat produced by the LEDs.

It is understood that any of the back panel 202, light panel 204, and optics panel 206 may actually be two or more physical substrates rather than a single panel as illustrated in FIG. 2. Furthermore, it is understood that there may be additional panels positioned behind the back panel 202, in front of the optics panel 206, and/or between the back panel 202 and light panel 204 and/or between the light panel 204 and optics panel 206.

Figure 3B:
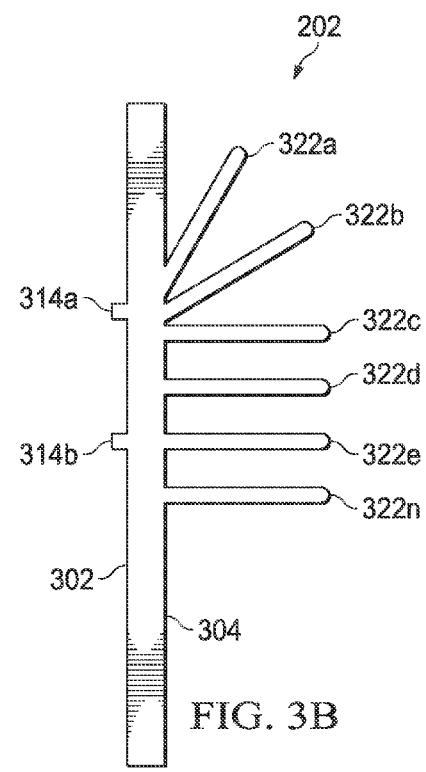
FIGS. 3A and 3B illustrate one embodiment of a back panel that may be used in the lighting assembly of FIG. 2.
Figure 3A:
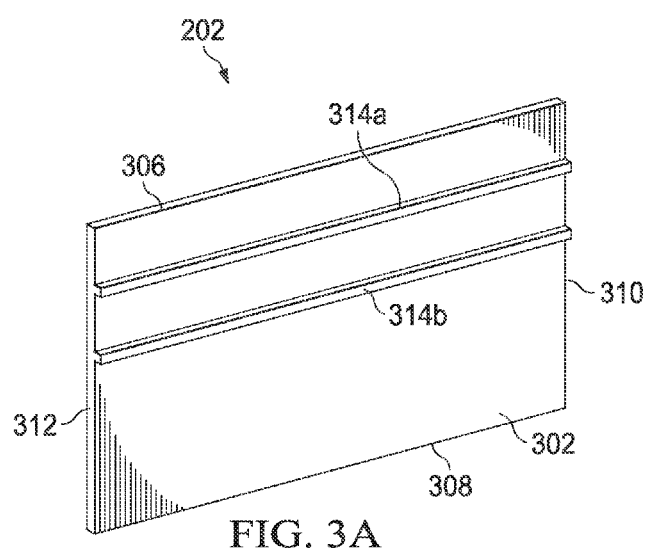
Figure 3C:
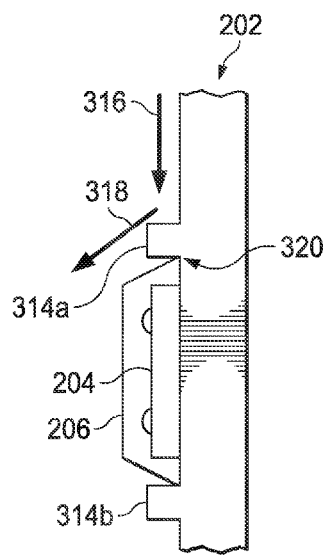
FIG. 3C illustrates one embodiment of the back panel of FIGS. 3A and 3B with a light panel and an optics panel that may also be used in the lighting assembly of FIG. 2.

Referring to FIGS. 3A-3C, one embodiment of the back panel 202 is illustrated with a front surface 302 and a back surface 304. The back panel 202 includes a top edge 306, a bottom edge 308, a right edge 310, and a left edge 312. The panel 202 may be formed of one or more thermally conductive materials (e.g., aluminum) and/or other materials.

The front surface 302 provides a mounting surface for the light panel 204. In some embodiments, the front surface 302 of the panel 202 may include one or more protrusions 314a and 314b that are substantially parallel to the top edge 306. The protrusions 314a and 314b may be configured to protect the light panel 204 from moisture. Although only two protrusions 314a and 314b are illustrated, it is understood that a single protrusion may be provided or three or more protrusions may be provided. Furthermore, such protrusions may vary in length, shape (e.g., may have angled or curved surfaces), orientation, and/or location on the front surface 302.

Referring specifically to FIG. 3C, a light panel 204 and an optical panel 206 may be mounted under the protrusion 314a (FIG. 3C). Moisture running down the front surface 302 in the direction of arrow 316 may strike the protrusion 314a and be directed away from the light panel 204 and optical panel 206 as shown by arrow 318. Although not shown, moisture may also be directed length down the protrusion 314a. Accordingly, protrusion 314a may serve as a gutter and aid in directing moisture away from a joint 320 where the optical panel 206 abuts the front surface 302. This may be beneficial even when a moisture resistant compound is used to seal the joint 320. In embodiments where there are multiple light panels 204 arranged vertically on the front surface 302, there may be a protrusion positioned above each light panel 204. For example, the protrusion 314a may be positioned directly above one light panel 204 and the protrusion 314b may be positioned directly above another light panel 204.

Referring specifically to FIG. 3B, the back surface 304 may be configured to increase heat dissipation. For example, the back surface 304 may be configured with a heat sink provided by fins 322a-322N, where N denotes a total number of fins. The fins 322a-322N increase the surface area of the back surface 304, thereby providing for additional heat dissipation to the surrounding air. The fins 322a-322N may be formed as part of the panel 202 or may be otherwise coupled to the panel 202 (e.g., may be part of a discrete heat sink that is coupled to the back surface 304). Some or all of the fins 322a-322N may be angled, as shown by fins 322a and 322b. In some embodiments, holes (not shown) may be provided in some or all of the fins 322a-322N to aid in air circulation. In such embodiments, the holes may cause a chimney effect in which heated air rises through the holes and is replaced by cooler air. This may be particularly effective in environments where natural air movement is limited.

Figure 4B:
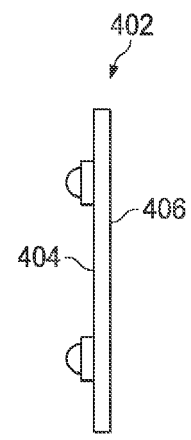
FIGS. 4A and 4B illustrate one embodiment of a light panel that may be used with the lighting assembly of FIG. 2.
Figure 4A:
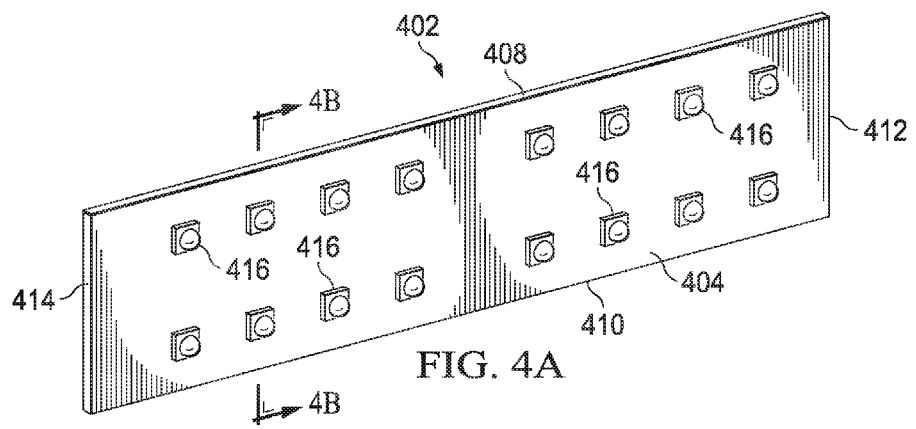

Referring to FIGS. 4A and 4B, one embodiment of a single PCB 402 of the light panel 204 is illustrated. In the present example, the light panel 204 may include multiple PCBs 402, although it is understood that any number of PCBs may be used based on design issues such as the amount of illumination needed, the amount of illumination provided by a single PCB 402, the size of the surface 102 of the billboard 100, and/or other factors. As shown in the present embodiment with a substantially rectangular cross-section, the PCB 402 includes a front surface 404, a back surface 406, a top edge 408, a bottom edge 410, a right edge 412, and a left edge 414.

The PCB 402 may include one or more strings of LEDs 416, with multiple LEDs 416 in a string. For example, a string may include eight LEDs 416 and each PCB 402 may include two strings for a total of sixteen LEDs 416. In this configuration, a light panel 204 having eight PCBs 402 would include ninety-six LEDs 416. It is understood that although the PCBs 404 are shown as being substantially identical, they may be different in terms of size, shape, and other factors for a single light panel 204.

In the present example, the LEDs 416 are surface mounted, but it is understood that the LEDs 416 may be coupled to the panel 204 using through hole or another coupling process. The surface mounted configuration may ensure that a maximum surface area of each LED 416 is in contact with the PCB 404, which is in turn in contact with the back panel 202 responsible for heat dissipation. Each string of LEDs may receive a constant current with the current divided evenly among the LEDs 416.

Referring to FIGS. 5A, 5B, 5C and 5D, one embodiment of a single lens panel 500 of the optics panel 206 is illustrated. In the present example, the optics panel 206 may include multiple lens panels 500, although it is understood that any number of lens panels may be used based on design issues such as the number, arrangement, and orientation of the LEDs 416, the size of the surface 102, and/or other factors. As shown in the present embodiment with a substantially rectangular cross-section that is configured for use with the PCB 402 of FIG. 4, a single lens panel 500 includes a front surface 502, a back surface 504, a top side 506, a bottom side 508, a right side 510, and a left side 512. The sides 506, 508, 510, and 512 may form a cavity into which the PCB 402 may fit, thereby providing protection for the PCB 402 from environmental conditions such as moisture.

The lens panel 500 may include a beveled or angled top side 506 and/or bottom side 508 as illustrated in FIG. 5B. The beveling/angling may aid in preventing moisture from reaching the PCB 402 under the lens panel 500, as water will more readily flow from the area of the joint 320 (FIG. 3C) due to the angled surface than if the top side 506 was relatively flat.

The lens panel 500 may include multiple optical elements 514. A single optical element 514 may be provided for each LED 416, a single optical element 514 may be provided for multiple LEDs 416, and/or multiple optical elements 514 may be provided for a single LED 416. In some embodiments, the optical elements 514 may be provided by a single multi-layer optical element system provided by the lens panel 500.

In the present example, the optical elements 514 are configured so that the light emitted from each LED 416 is projected onto the entire surface 102 of the billboard 100. In other words, if all other LEDs 416 were switched off except for a single LED 416, the entire surface 102 would be illuminated at the level of illumination provided by the single LED 416. In one embodiment, the rectangular target area of the surface 102 would be evenly illuminated by the LED 416, while areas beyond the edges 112, 114, 116, and 118 would receive no illumination at all or at least a minimal amount of illumination from the LED 416. What is meant by "evenly" is that the illumination with a uniformity that achieves a 3:1 ratio of the average illumination to the minimum. Thus, by designing the lens in such a manner, when all LEDs are operating, the light form the collective thereof will illuminate the surface at the 3:1 ratio. When one or more LEDs fail, the overall illumination decreases, but the uniformity maintains the same uniformity. Also, as described hereinabove, the "surface" refers to the surface that is associated with a particular LED panel. It may be that an overall illuminated surface is segmented and multiple panels are provided, each associated with a particular segment.

FIG. 5C illustrates a detail of the lens assembly. Each of the diodes 416 is mounted on the board 408 at a minimum distance. Overlying the board and LEDs 416 is transparent lens substrate 520. This substrate 520 has a plurality of lens structures 522, each associated with one of the LEDs 416, such that each of the LEDs 416 has the light emitted therefrom directed outward towards the surface, each lens structure being substantially the same. The minimum distance is designed such that overlapping light from adjacent LEDs does not create interference patters and result in dead spots on the surface. The lens structure 522 is designed to create the 3:1 uniformity and also, the lens structure is designed to "direct" the light from an edge of the surface to cover the entire surface. This is shown by the angle of the light rays in FIG. 5C. Also, the beveled edge 530 will basically surround the PCB 408, thus protecting it from moisture. The lens substrate 520 is secured with screws (not shown).

FIG. 5D illustrates a detail of the lens structure 522. This structure includes an interior surface 524 and an exterior surface 526 that shapes and directs the light in the correct pattern. This is an acrylic material. With such a design, the lighting assembly can be disposed at an edge of the surface to illuminate the entire surface.

In some embodiments, as shown in FIG. 1, two lighting assemblies 110 may be used. Each lighting assembly may be powered by a separate power supply (not shown), and may be configured to illuminate the entire surface 102. In such an embodiment, if one power supply fails, the remaining lighting assembly 110 will still illuminate the entire surface 102, although at a lesser intensity than when both lighting assemblies 110 are functioning. This provides evenly distributed illumination when both lighting assemblies 110 are functioning correctly, and continues to provide evenly distributed illumination when one lighting assembly 110 malfunctions. Accordingly, the entire surface 102 of the billboard 100 may be illuminated even when an entire lighting assembly 110 has malfunctioned and is providing no illumination at all due to the redundancy provided by configuration of the lighting assemblies 110.

Furthermore, in some embodiments as described above, each LED 416 of a single lighting assembly 110 may be configured via the optical elements 514 to illuminate the entire surface 102. In such embodiments, if one or more LEDs 416 or strings of LEDs fails, the remaining LEDs 416 will still illuminate the entire surface 102, although at a lesser intensity than when the failed LEDs 416 are functioning. This provides evenly distributed illumination when all LEDs 416 are functioning correctly, and continues to provide evenly distributed illumination when one or more LEDs are malfunctioning. Accordingly, the billboard 100 may be illuminated even when multiple LEDs 416 have malfunctioned and are providing no illumination at all due to the redundancy provided by configuration of the lighting assemblies 110.

It is understood that some embodiments may direct substantially all illumination from a lighting assembly 110 evenly across the surface 102 while some illumination is not evenly distributed. For example, substantially all LEDs 416 may be directed to each evenly illuminate the surface 102 with the exception of a relatively small number of LEDs 416. In such cases, the illumination provided by the remaining LED or LEDs 416 may be directed to one or more portions of the surface 102. If done properly, this may be accomplished while minimizing any noticeable unevenness in the overall illumination, even if one of the remaining LEDs 416 malfunctions. For example, the lighting assembly 110 may be configured to direct the illumination provided by one LED 416 to only the left half of the surface 102, while directing the illumination from another LED 416 to only the right half of the surface 102. The loss of one of these two LEDs may not noticeably impact the illumination of the surface 102. It is understood that such variations are within the scope of this disclosure.

In embodiments where the illumination is evenly distributed across the surface 102, it is understood that the optics panel 206 may be configured specifically for the light panel 204 and the surface 102. For example, assuming the surface 102 is forty-eight feet wide and sixteen feet high, the lens panel 500 of FIG. 5 may be specifically designed for use with the PCB 402 of FIG. 4. This design may be based on the particular layout of the PCB 402 (e.g., the number and arrangement of the LEDs 416), the amount of illumination provided by the LEDs 416, the size of the surface 102, the distance between the lens panel 500 and the surface 102, the angle at which the lens panel 500 is mounted relative to the surface 102 (e.g., FIGS. 1B-1D), and/or other factors. Accordingly, changes in any of these factors may entail a change in the design of the lens panel 500 in order to again evenly distribute the illumination provided by each LED 416 across the entire surface 102. It is understood that various standard configurations of the lighting assembly 110 may be developed for various billboard and/or other externally illuminated signs so that a particular configuration may be provided based on the parameters associated with a particular billboard and/or externally illuminated sign.

Figure 6A:
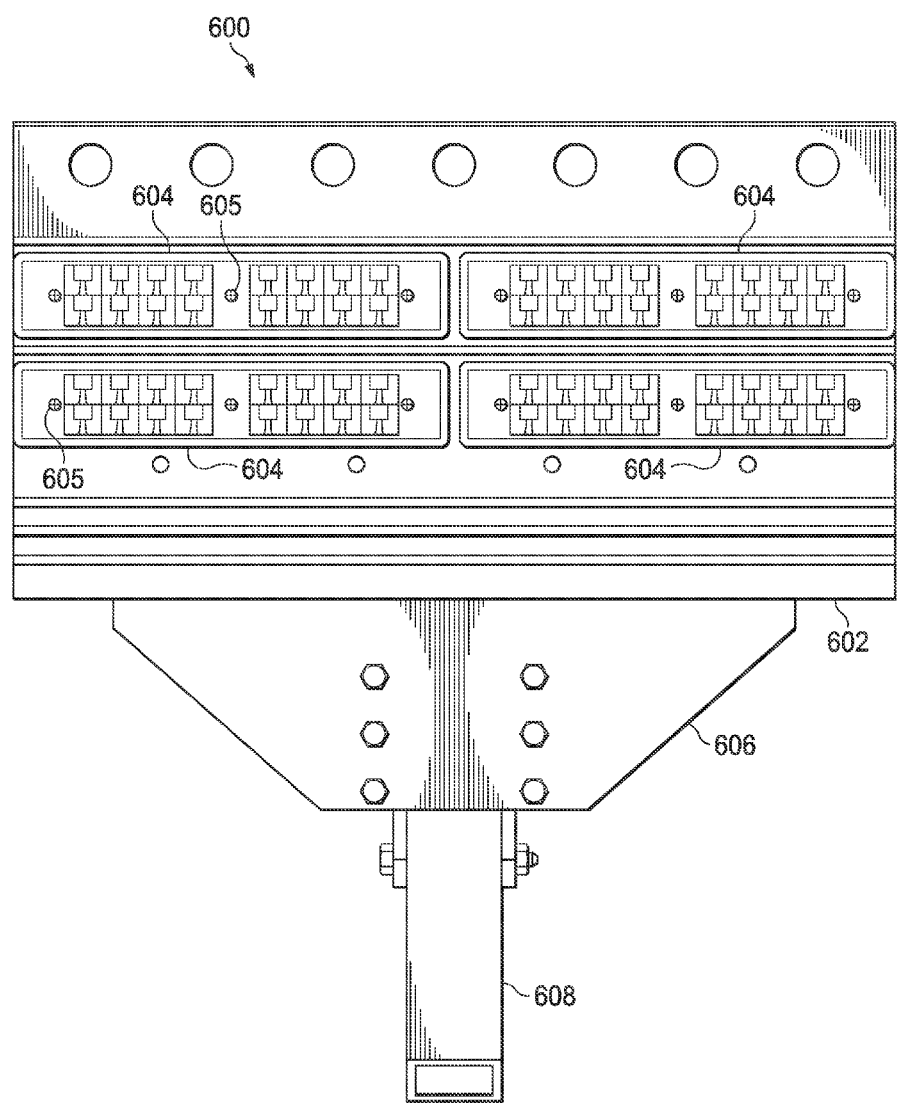
FIGS. 6A-6C illustrate a more detailed embodiment of the lighting assembly of FIG. 2.
Figure 6B:
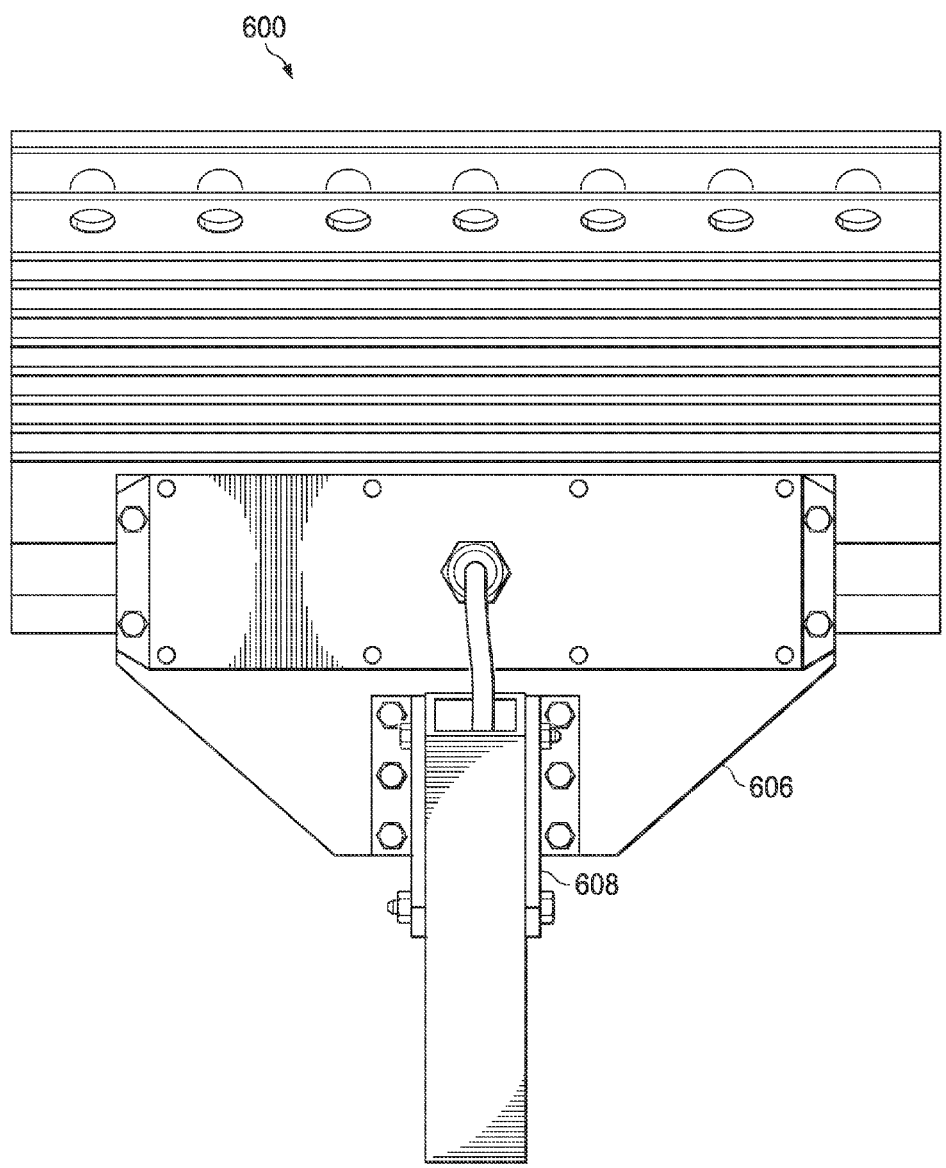
Figure 6C:
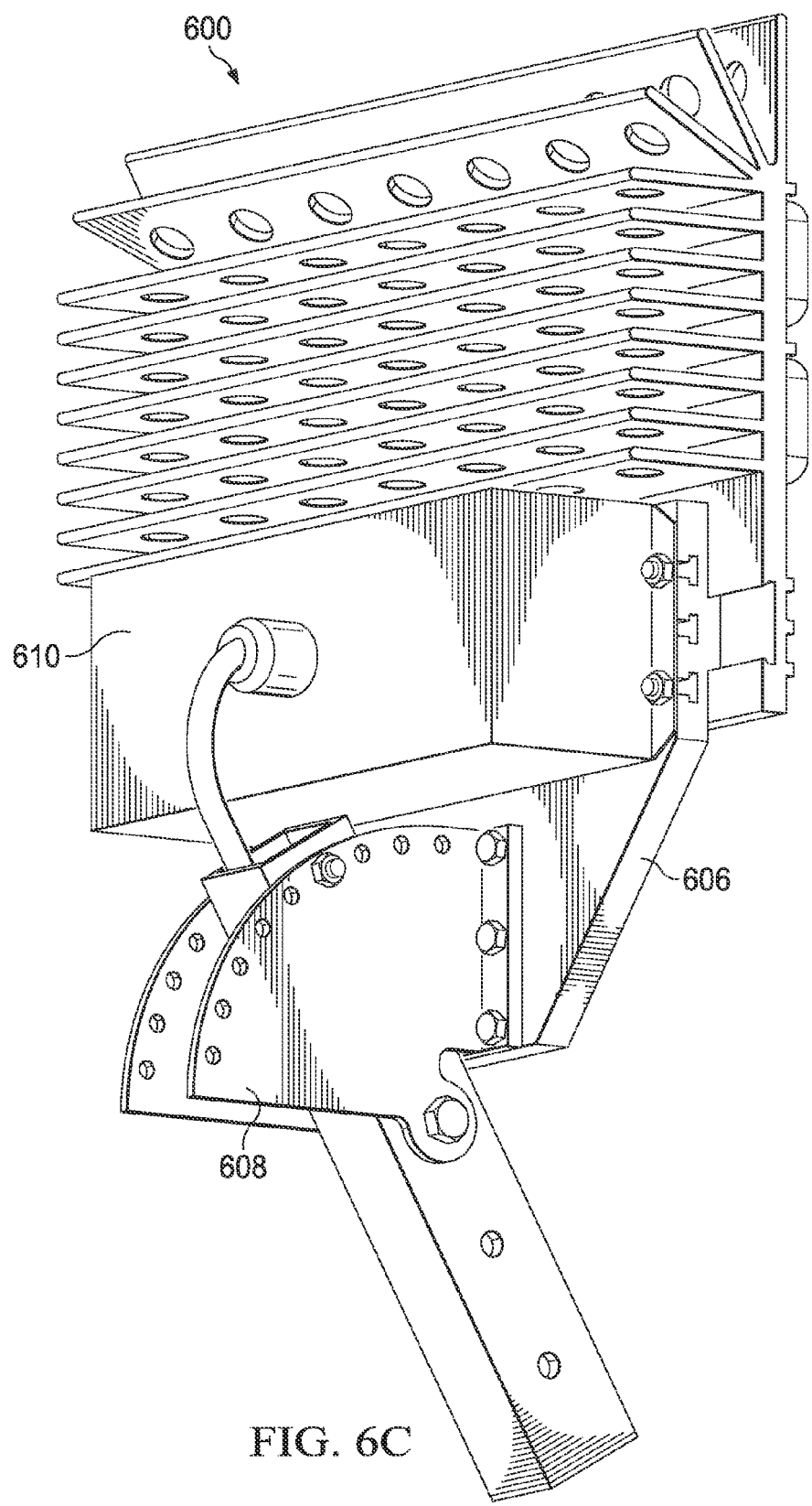

Referring to FIGS. 6A-6C, one embodiment of a lighting assembly 600 is illustrated that provides a more detailed embodiment of the lighting assembly 200 of FIG. 2. The lighting assembly 600 includes a back panel 602, a light panel formed by multiple LED assemblies (denoted by reference number 800 in FIG. 8A), and an optics panel formed by multiple lens panels 604. Accordingly, as described previously, the light panel 204 in the current example is represented by multiple LED assemblies 800 and the optics panel 206 is represented by multiple lens panels 604. In the present embodiment, the lighting assembly 600 includes four LED assemblies 800 and four lens panels 604.

Although various attachment mechanisms (e.g., threaded screws, bolts, and/or other fasteners) may be used to coupled the lens panels and LED assemblies to the back panel 602, the present embodiment uses multiple threaded fasteners 605 (e.g., screws) that extend through the lens panels and the LED assemblies and engage threaded holes in the back panel 602.

The lighting assembly 600 is also illustrated with a mounting plate 606 that couples to the back panel 602 and to an adjustable mounting bracket 608. The adjustable mounting bracket 608 may be used to couple the lighting assembly 600 to a portion of the billboard 100 (FIG. 1) and/or to another support member. A power supply enclosure 610 may be coupled to the mounting plate 606 and configured contain a power supply (not shown) capable of supplying power to LEDs of the LED assemblies 800. It is noted that separating the power supply from the back panel 602 may aid in heat dissipation by the back panel 602 as it does not have to dissipate heat from the power supply to the same extent as if the power supply was mounted directly to the back panel 602.

The location of the power supply may also be beneficial as snow not melted by the heat produced by the LED may be melted by heat produced by the power supply. This may aid in reducing snow buildup on the LEDs.

Figure 7A:
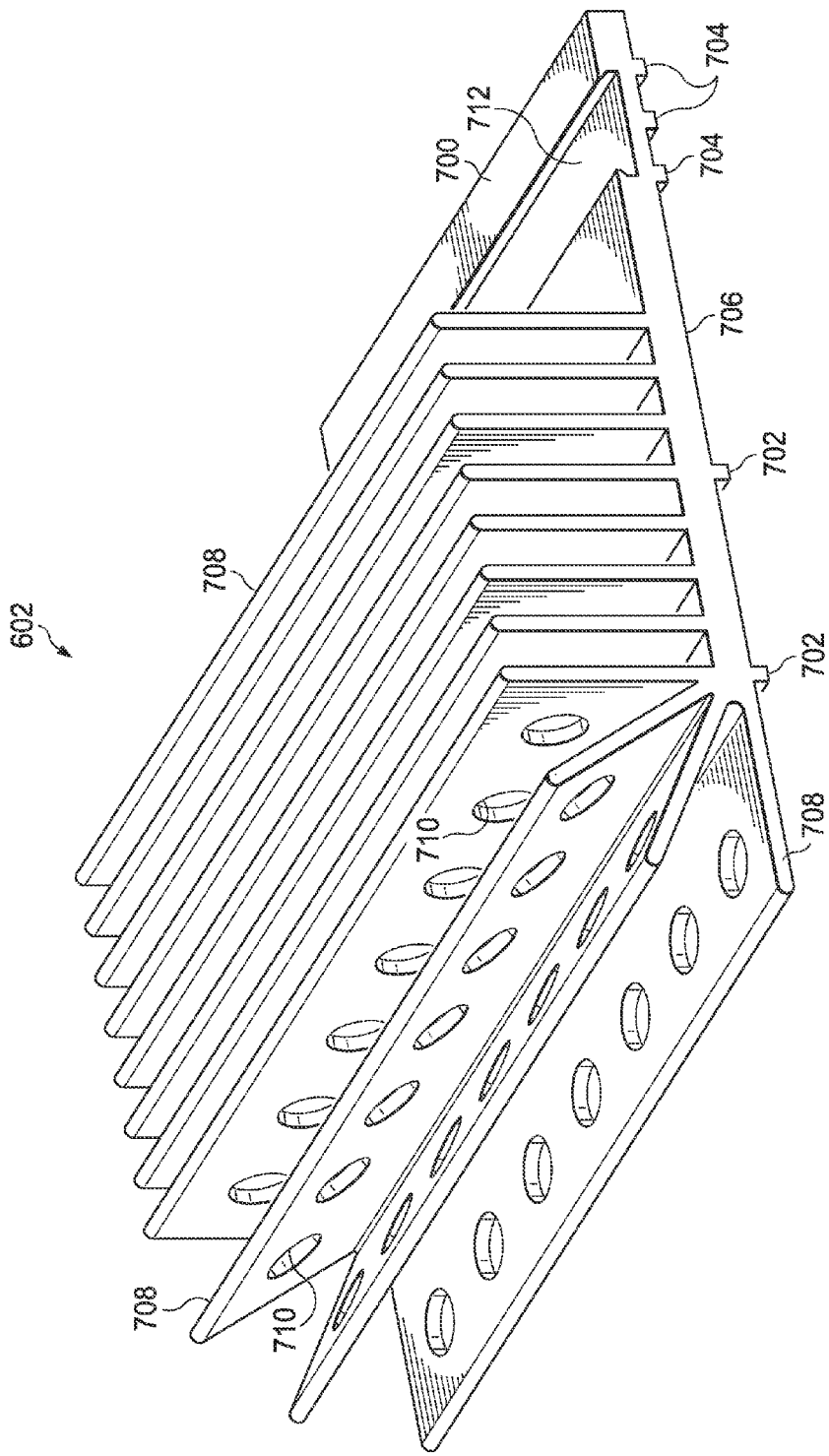
FIGS. 7A and 7B illustrate an embodiment of a back panel that may be used with the lighting assembly of FIGS. 6A-6C.
Figure 7B:
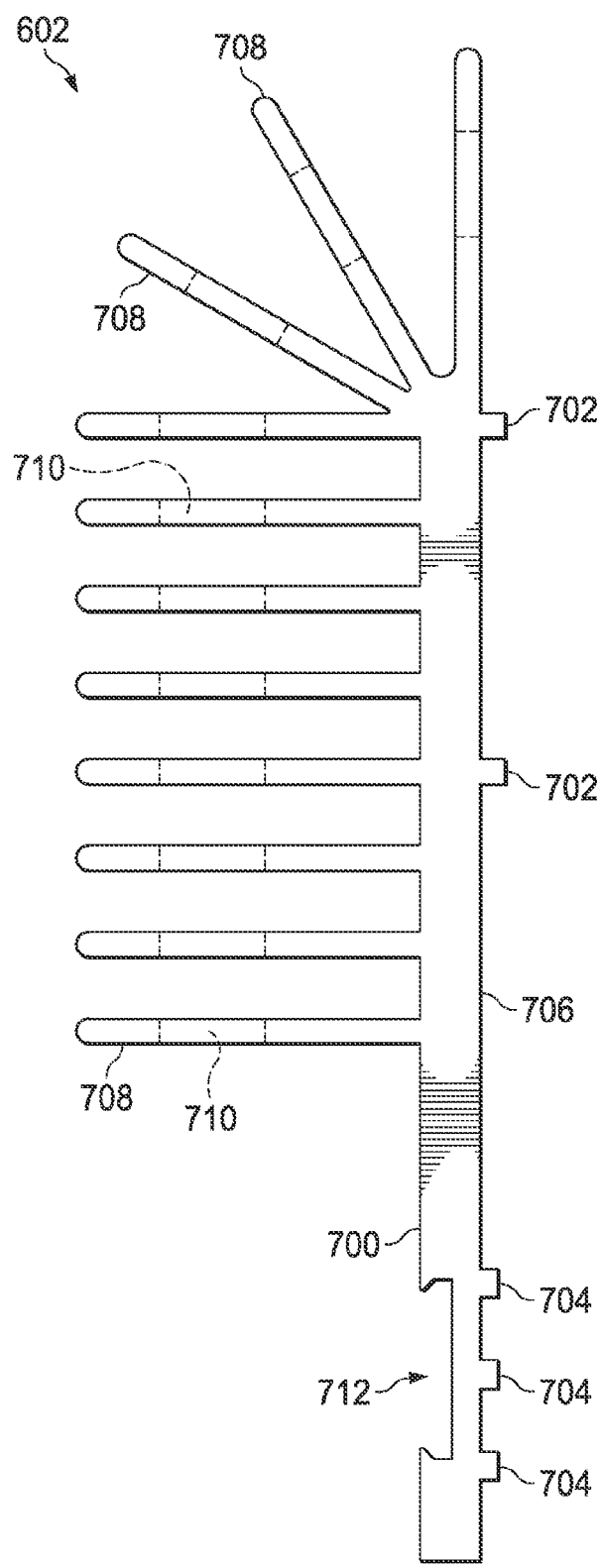

With additional reference to FIGS. 7A and 7B, one embodiment of the back panel of FIG. 602 is illustrated. A front surface 700 includes multiple protrusions 702 that may be configured to protect the light panels (not shown) against moisture as previously described. The front surface 700 may include additional protrusions 704.

A back surface 706 includes multiple fins 708 that form a heat sink to aid in the dissipation of heat from the back panel 602. In the present example, the fins 708 are substantially rectangular in shape. In the present example, the back panel 602 is extruded and the fins 708 run parallel to the top edge with a longitudinal axis of each fin 708 being substantially parallel to a longitudinal axis of the back panel 602. Forming the fins 708 in a vertical manner is possible, but may increase the cost of the back panel 602 due to the extrusion process. As shown, the fins 708 may be substantially perpendicular to the back surface 706, and/or may be angled. In the present example, the fins 708 are angled such that near the top of the back panel 702, the fins 708 are angled towards the top.

Because the fins 708 are parallel to the top edge, heat may be trapped due to its inability to rise vertically. Accordingly, holes 710 may be present in some or all of the fins 708 (marked but not actually visible in the side view of FIG. 7B) to provide paths for the heat to rise vertically in spite of the orientation of the fins 708. The holes 710 may create a chimney effect that increases air flow across the fins 708 and aids in the cooling process. In some embodiments, some or all of the fins 708 may be angled such that heat is not trapped.

The back surface 706 may also include a groove 712 that is configured to receive a tongue of the mounting plate 606 in a tongue-in-groove manner.

With additional reference to FIGS. 8A-8J, embodiments of a single LED assembly 800 and a single lens panel 604 that may be used with the lighting assembly 600 are illustrated. As shown, the single LED assembly 800 and the single optics panel 604 may be configured for use together.

Figure 8A:
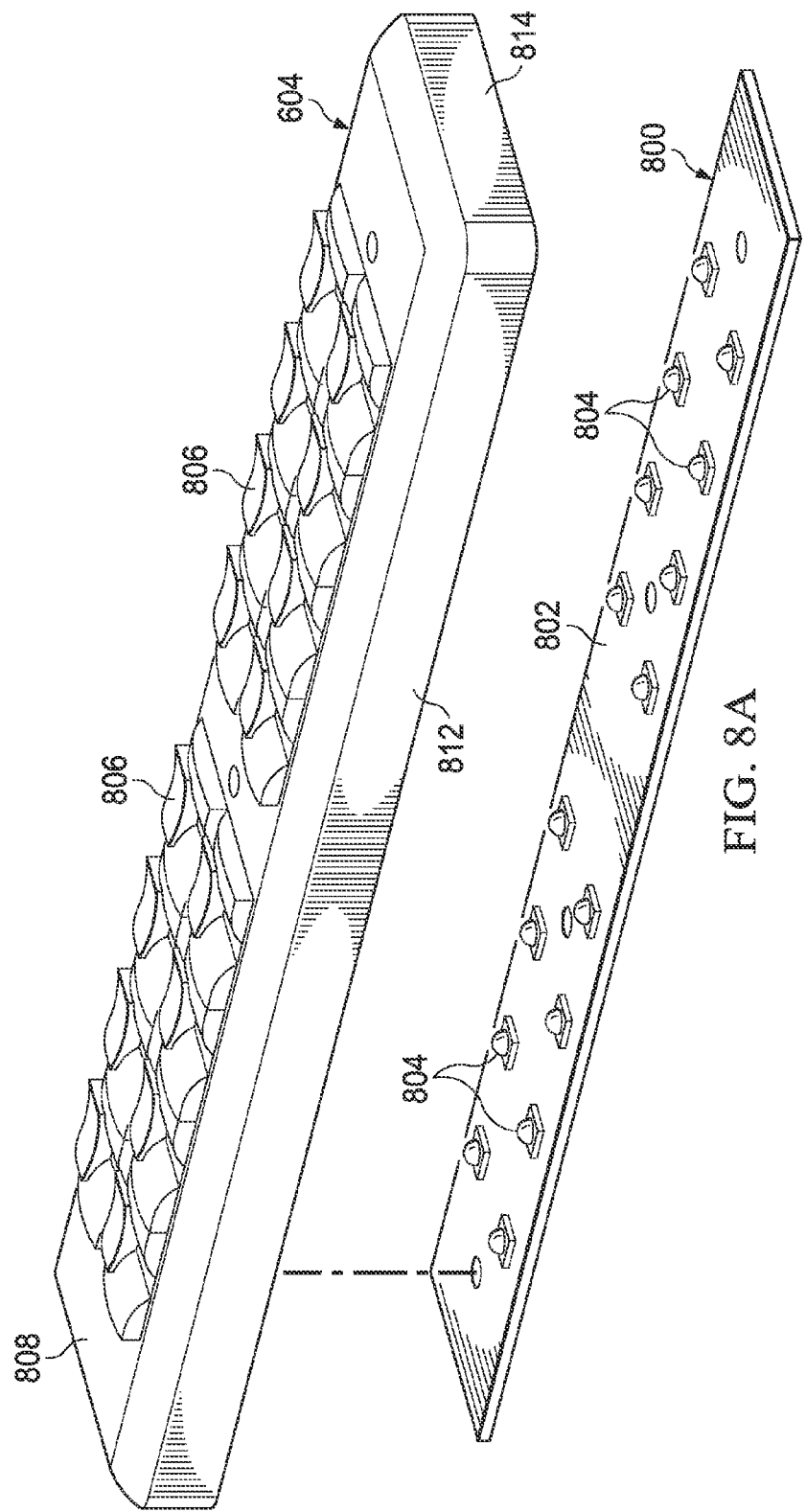
FIG. 8A illustrates an embodiment of an LED assembly and an optics panel that may be used with the lighting assembly of FIG. 6.

Referring specifically to FIG. 8A, the LED assembly 800 includes a substrate 802 (e.g., a PCB) onto which are mounted multiple LEDs 804. In the present example, the LED assembly 800 includes two strings of eight LEDs 804 each for a total of sixteen LEDs 804. It is understood that this is merely an example, and there may be more or fewer LEDs 804 on the light panel 800, and the LEDs 804 may be arranged in many different ways on the substrate 802.

Referring also to FIGS. 8B-8J, the optics panel 604 may include optical elements 806 arranged on an upper surface 808 of the optics panel 604. The optics panel 604 may further include sides 810, 812, 814, and 816 that are configured to fit around the edge of the substrate 802 of the light panel 800. The bottom edge of each side 810, 812, 814, and 816 abuts the front surface 700 of the back panel 602 and may be sealed to the front surface 700 using a moisture resistant sealant.

As shown in FIGS. 8D-8H, a single optical element 806 may include multiple lens elements designed to distribute the illumination provided by a single LED 804 across a surface such as the surface 102 of FIG. 1. A first lens element 820 may be positioned proximate to the LED 804, and additional lens elements 822, 824, and 826 may be positioned above the lens element 820. Multiple optical elements 806 may be combined and formed as a single optics panel 604 that is configured to operate with the LED assembly 800.

Figure 9:
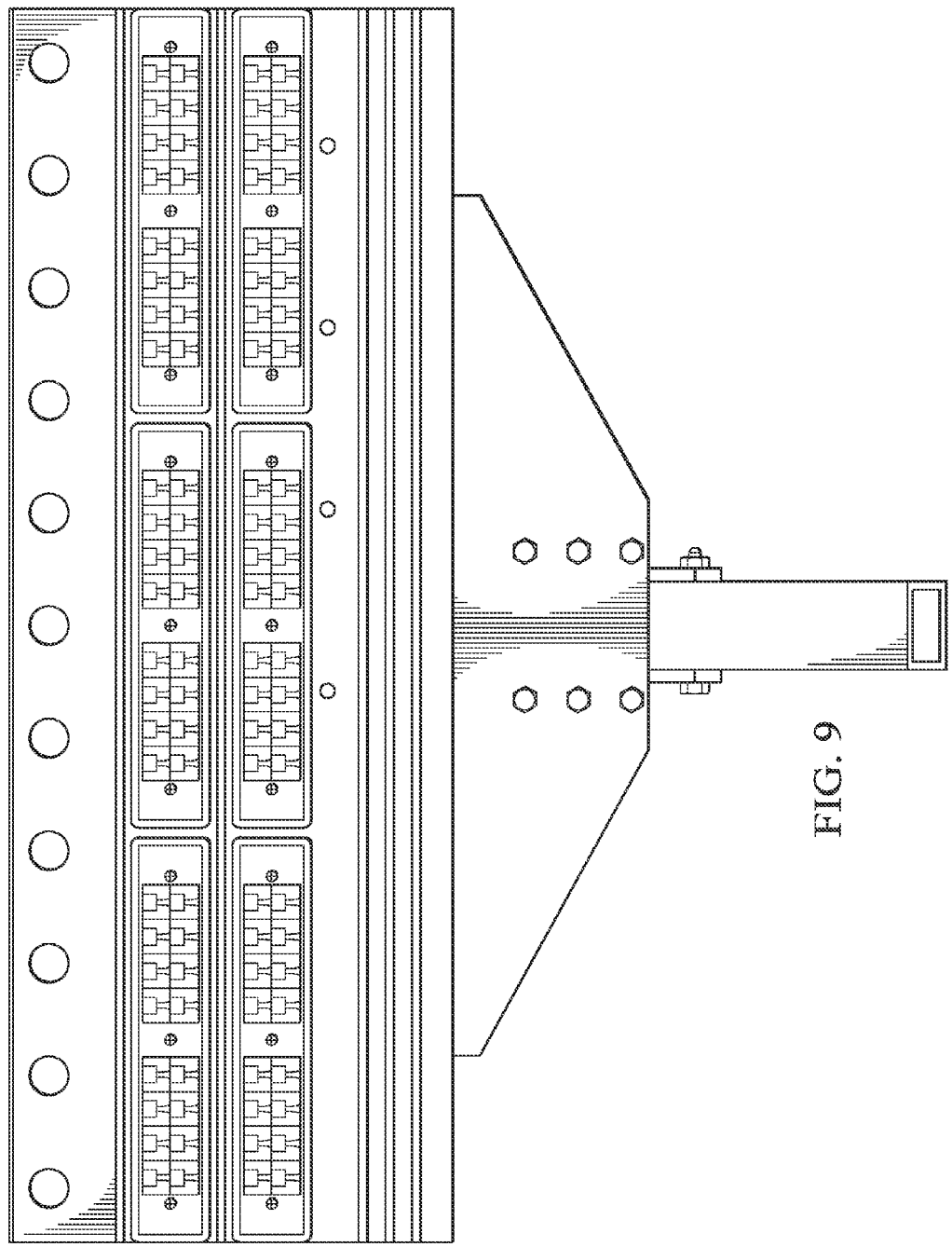
FIG. 9 illustrates a more detailed embodiment of the lighting assembly of FIG. 2.

Referring to FIG. 9, another embodiment of a lighting assembly 900 is illustrated that provides a more detailed embodiment of the lighting assembly 200 of FIG. 2. The lighting assembly 900 is similar to the lighting assembly 600 of FIG. 6, but includes six LED assemblies rather than the four six LED assemblies of the lighting assembly 600. It is understood that the lighting assembly 900 may require a larger power supply than the lighting assembly 600 (e.g., a one hundred and fifty watt power supply instead of a one hundred and twenty watt power supply).

Although the preferred embodiment has been described in detail, it should be understood that various changes, substitutions and alterations can be made therein without departing from the spirit and scope of the invention as defined by the appended claims.

What is claimed is:

1. A back panel for use in a light emitting diode (LED) lighting assembly that is operable to be affixed to a structure supporting a display surface that is to be illuminated comprising:

an extruded substrate formed of a thermally conductive material, the substrate having a first and second substantially flat surface and first and second side edges perpendicular to a top edge extending therebetween and having a plurality of longitudinal fins extending from the first side edge of the substrate to the second side edge of the substrate, each of the fins having a substantially rectangular shape oriented so that a longitudinal axis of the fin is substantially parallel to a longitudinal axis of the substrate along the at least top edge, wherein at least some of the fins which are adjacent to each other include a plurality of holes formed through the plurality of fins to enable heated air to rise through the adjacent fins, the holes aligned such that they create a chimney effect between the associated adjacent fins, wherein a plurality of LEDs are mounted on the second surface of the substrate, and oriented in a longitudinal orientation and parallel to the top edge with the fins, when the back panel is affixed to the structure with the second surface substantially parallel to the display surface, oriented parallel to the bottom edge of the display surface to be illuminated, such that heat rises perpendicular to the surface of the fins, a first longitudinal protrusion extending from the second surface proximate the LEDs and parallel to the top edge between the LEDs and the top edge to cause water to be partially directed away therefrom when the back panel is affixed to the structure.

2. The back panel of claim 1, the LEDs are mounted on an upper surface of a first LED structure having a longitudinal structure which is in turn has a lower surface that is mounted on the second surface of the substrate with an edge thereof proximate the first longitudinal protrusion.

3. The back panel of claim 2, wherein the LED structure with the LEDs mounted thereon is less in thickness that the height of the protrusion above the second surface.

4. The back panel of claim 2, wherein the LED structure is comprised of a support layer for mounting of the LEDs on the upper surface and an optical layer disposed over the LEDs and wherein the edge of the LED structure abuts the first protrusion.

5. The back panel of claim 4, wherein the optical layer overlaps the edge of support layer.

6. The back panel of claim 4, where the interface between the lower surface of the support layer and the optical layer form a joint and the edge of the joint abuts the first protrusion.

7. The back panel of claim 2, wherein the first protrusion has an angled surface.

8. The back panel of claim 2, wherein the first protrusion has a curved surface.

9. The back panel of claim 1, and further comprising a second LED structure similar to the first LED structure mounted on the second surface diametrically opposite the top edge from the first LED structure and a second longitudinal protrusion extending from the second surface proximate the edge of the second LED structure that is nearest the top edge, the second longitudinal protrusion proximate the edge of the first LED structure farthest from the top edge.

10. The back panel of claim 1, and further comprising a mount to allow the surface of the substrate to have the angle thereof varied.

11. The back panel of claim 1, wherein a plurality of the fins are disposed perpendicular to the first surface and a plurality of the fins are disposed at an angle thereto.

12. A lighting display, comprising:
a display surface for being illuminated;
a support structure for supporting the display surface in an upright position such that the display surface is viewable from a horizontal viewing plane;
a mounting structure disposed on the lower edge of the support structure anterior to the display surface; and
a back panel for use in a light emitting diode (LED) lighting assembly that is operable to be affixed to the display surface, including:
an extruded substrate formed of a thermally conductive material, the substrate having a first and second substantially flat surface and first and second side edges perpendicular to a top edge extending there between and having a plurality of longitudinal fins extending from the first side edge of the substrate to the second side edge of the substrate, each of the fins having a substantially rectangular shape oriented so that a longitudinal axis of the fin is substantially parallel to a longitudinal axis of the substrate along the at least top edge, wherein at least some of the fins which are adjacent to each other include a plurality of holes formed through the plurality of fins to enable heated air to rise through the adjacent fins, the holes aligned such that they create a chimney effect between the associated adjacent fins, wherein a plurality of LEDs are mounted on the second surface of the substrate, and oriented in a longitudinal orientation and parallel to the top edge with the fins, when the back panel is affixed to the structure with the second surface substantially parallel to the display surface, oriented parallel to the bottom edge of the display surface to be illuminated, such that heat rises perpendicular to the surface of the fins, a first longitudinal protrusion extending from the second surface proximate the LEDs and parallel to the top edge between the LEDs and the top edge to cause water to be partially directed away therefrom when the back panel is affixed to the mounting structure.

13. A support structure for a light emitting diode (LED) lighting assembly comprising:
a heat sink comprising a thermally conductive substrate, the thermally conductive substrate comprising a first major surface and an opposite second major surface, wherein the first major surface has a first edge along a first direction and a second edge along a second direction perpendicular to the first direction, wherein the heat sink is configured to support a LED panel and an optics panel over the first major surface along a third direction perpendicular to the first and the second directions; and
a plurality of fins extending away from the second major surface and disposed on the thermally conductive substrate, wherein a fin of the plurality of fins comprise a length along the first direction longer than a width along the second direction, wherein the thermally conductive substrate comprises protrusions extending away from the first major surface into the third direction, wherein the protrusions comprise a length along the first direction longer than a width along the second direction.

14. The support structure of claim 13, wherein the plurality of fins comprise air holes.

15. The support structure of claim 13, wherein one of the protrusions overlaps with a fin of the plurality of fins.

16. The support structure of claim 13, wherein the plurality of fins comprise a first fin, a second fin, and a third fin, wherein the first fin is parallel to the second fin, wherein the second fin is oriented at an acute angle to the third fin.

17. The support structure of claim 16, further comprising a fourth fin and a fifth fin, wherein the fourth fin is oriented at an acute angle to the third fin, and the fifth fin is parallel to the first major surface.

18. The support structure of claim 17, wherein the fourth fin and the fifth fin are adjacent the first edge.

19. The support structure of claim 16, further comprising a fourth fin parallel to the first major surface.

20. The support structure of claim 13, further comprising:
a groove on the second major surface of the thermally conductive substrate; and
a mounting plate disposed over the second major surface of the heat sink, wherein the groove is configured to receive a tongue of the mounting plate.

21. The support structure of claim 20, further comprising an adjustable mounting bracket configured to couple the lighting assembly to a billboard and/or a support member, wherein the adjustable mounting bracket is attached to the mounting plate.

22. The support structure of claim 20, wherein the groove is spaced away from the plurality of fins along the second direction, and wherein the thermally conductive substrate is thinner at the groove than at a location directly below the plurality of fins.

23. The support structure of claim 20, further comprising a power supply enclosure mounted over the mounting plate, wherein the power supply enclosure is separated from the heat sink by the mounting plate.

24. The support structure of claim 20, wherein the thermally conductive substrate comprises secondary protrusions extending away from the first major surface into the third direction, wherein the secondary protrusions extend along the entire length of the thermally conductive substrate along the first direction, wherein a protrusion of the secondary protrusions overlaps with the groove.

25. The support structure of claim 13, wherein the protrusions extend along the entire length of the thermally conductive substrate along the first direction.

26. The support structure of claim 13, wherein the protrusions comprise a first protrusion spaced from a second protrusion, wherein the spacing between the first protrusion and the second protrusion is configured to enable mounting of the LED panel and the optics panel between the first protrusion and the second protrusion.

27. The support structure of claim 13, wherein the width of the protrusions is about the same as the width of a fin of the plurality of fins.

28. A support structure for a light emitting diode (LED) lighting assembly comprising:
   a heat sink comprising a thermally conductive substrate, the thermally conductive substrate comprising a first major surface and an opposite second major surface, wherein the first major surface has a first edge along a first direction and a second edge along a second direction perpendicular to the first direction, wherein the heat sink is configured to support a LED panel and an optics panel over the first major surface along a third direction perpendicular to the first and the second directions; and
   a plurality of fins extending away from the second major surface and disposed on the thermally conductive substrate, wherein the plurality of fins comprise a first fin, a second fin, and a third fin, wherein the first fin and the second fin comprise a length along the first direction longer than a width along the second direction, wherein the first fin is parallel to the second fin, wherein the second fin is oriented at an acute angle to the third fin, wherein the thermally conductive substrate comprises protrusions extending away from the first major surface into the third direction, wherein the protrusions comprise a length along the first direction longer than a width along the second direction;
   a mounting plate disposed over the second major surface of the heat sink;
   a power supply enclosure mounted over the mounting plate; and
   an adjustable mounting bracket configured to couple the lighting assembly to a billboard and/or a support member, wherein the adjustable mounting bracket is attached to the mounting plate.

29. The support structure of claim 28, wherein a protrusion of the protrusions overlaps with a fin of the plurality of fins.

30. The support structure of claim 28, further comprising a fourth fin and a fifth fin, wherein the fourth fin is oriented at an acute angle to the third fin, and the fifth fin is parallel to the first major surface.

31. The support structure of claim 28, further comprising a fourth fin parallel to the first major surface.

32. The support structure of claim 28, further comprising:
   a groove on the second major surface of the thermally conductive substrate, wherein the groove is spaced away from the plurality of fins along the second direction, and wherein the thermally conductive substrate is thinner at the groove than at a location directly below the plurality of fins.

33. A support structure for a light emitting diode (LED) lighting assembly comprising:
   a heat sink comprising a thermally conductive substrate, the thermally conductive substrate comprising a first major surface and an opposite second major surface, wherein the first major surface has a first edge along a first direction and a second edge along a second direction perpendicular to the first direction, wherein the heat sink is configured to support a LED panel and an optics panel over the first major surface along a third direction perpendicular to the first and the second directions; and
   a plurality of fins extending away from the second major surface and disposed on the thermally conductive substrate, wherein the plurality of fins comprise a first fin, a second fin, a third fin, a fourth fin and a fifth fin, wherein the first fin and the second fin comprise a length along the first direction longer than a width along the second direction, wherein the first fin is parallel to the second fin, wherein the second fin is oriented at a first acute angle to the third fin, wherein the fourth fin is oriented at a second acute angle to the third fin, and the fifth fin is parallel to the first major surface, wherein the first acute angle is different from the second acute angle, wherein the thermally conductive substrate comprises protrusions extending away from the first major surface into the third direction, wherein the protrusions comprise a length along the first direction longer than a width along the second direction.

* * * * *

UNITED STATES PATENT AND TRADEMARK OFFICE
CERTIFICATE OF CORRECTION

PATENT NO.       : 8,974,077 B2                                      Page 1 of 1
APPLICATION NO.  : 13/836517
DATED            : March 10, 2015
INVENTOR(S)      : Auyeung It is certified that error appears in the above-identified patent and that said Letters Patent is hereby corrected as shown below:

In the Claims

Col. 9, line 7, claim 3, delete "thickness that the" and insert --thickness than the--.

Signed and Sealed this
Ninth Day of June, 2015

Michelle K. Lee
*Director of the United States Patent and Trademark Office*

UNITED STATES PATENT AND TRADEMARK OFFICE
CERTIFICATE OF CORRECTION

| | | |
|---|---|---|
| PATENT NO. | : 8,974,077 B2 | Page 1 of 1 |
| APPLICATION NO. | : 13/836517 | |
| DATED | : March 10, 2015 | |
| INVENTOR(S) | : Auyeung et al. | |

It is certified that error appears in the above-identified patent and that said Letters Patent is hereby corrected as shown below:

Title Page, Item (72) Inventor, should read

--(72) Inventors: David Siucheong Auyeung, Carrollton, TX (US); William Y. Hall, Dallas, TX (US); Simon Magarill, Mountain View, CA (US)--.

Signed and Sealed this
Twenty-fourth Day of May, 2016

Michelle K. Lee
*Director of the United States Patent and Trademark Office*